United States Patent [19]

Florent

[11] Patent Number: 5,832,111
[45] Date of Patent: Nov. 3, 1998

[54] METHOD AND DEVICE FOR BINARY SEGMENTATION OF A SIGNAL REPRESENTING A DIGITAL IMAGE WITH A THRESHOLD OBTAINED USING A HISTOGRAM

[75] Inventor: Raoul Florent, Lillers, France

[73] Assignee: U.S. Philips Corporation, New York, N.Y.

[21] Appl. No.: 688,580

[22] Filed: Jul. 30, 1996

Related U.S. Application Data

[63] Continuation of Ser. No. 492,497, Jun. 20, 1995, abandoned, which is a continuation of Ser. No. 223,376, Apr. 5, 1994, abandoned, which is a continuation of Ser. No. 810,741, Dec. 18, 1991, abandoned.

[30] Foreign Application Priority Data

Dec. 21, 1990 [FR] France .................................... 90 16109

[51] Int. Cl.$^6$ ...................................................... G06K 9/46
[52] U.S. Cl. ........................... 382/171; 382/172; 382/173; 358/466
[58] Field of Search .................................... 382/270, 271, 382/273, 192, 173, 174, 204, 168, 171, 172; 358/465, 466

[56] References Cited

U.S. PATENT DOCUMENTS

| | | | |
|---|---|---|---|
| 3,805,239 | 4/1974 | Watanabe | 382/51 |
| 4,675,909 | 6/1987 | Egami et al. | 382/51 |
| 4,907,288 | 3/1990 | Shimoni | 382/54 |
| 4,959,869 | 9/1990 | Hongo | 382/50 |
| 4,975,972 | 12/1990 | Bose | 382/49 |
| 5,018,214 | 5/1991 | Pasch | 382/9 |
| 5,075,872 | 12/1991 | Kumagi | 382/51 |

FOREIGN PATENT DOCUMENTS

| | | | |
|---|---|---|---|
| 2555003 | 11/1984 | France | H04N 5/262 |
| 153771 | 7/1986 | Japan . | |

OTHER PUBLICATIONS

"Computer Science and Applied Mathematic: Digital Picture Processing" Rosenfeld et al, Academic Press, 1976, Chapter 10.

"La Vision Artificielle" Nouvel Automatisme, vol. 30, No. 51, pp. 45–51, Jan. 1985.

*Primary Examiner*—Joseph Mancuso
*Assistant Examiner*—Larry J. Prikockis
*Attorney, Agent, or Firm*—Leroy Eason

[57] ABSTRACT

Method and device for binary segmentation of a digital image with a threshold obtained using a histogram to obtain a binary segmented digital image. The digital image is thresholded a number of grey levels, and the number of objects which appear when the digital image is thresholded at each of the grey levels is counted. A histogram of the number of objects per grey level is constructed, and a segmentation threshold is determined automatically on the basis of the histogram. The digital image is then thresholded at the segmentation threshold to obtain the binary segmented digital image.

14 Claims, 2 Drawing Sheets

METHOD AND DEVICE FOR BINARY SEGMENTATION OF A SIGNAL REPRESENTING A DIGITAL IMAGE WITH A THRESHOLD OBTAINED USING A HISTOGRAM

This is a continuation of application Ser. No. 08/492,497, filed Jun. 20, 1995, now abandoned which is a continuation of application Ser. No. 08/223,376, now abandoned, filed Apr. 5, 1994, which is a continuation of application Ser. No. 07/810,741, filed Dec. 18, 1991, now abandoned.

FIELD OF THE INVENTION

The invention relates to a method and a device for binary segmentation of a digital image $I_0$ with a threshold obtained using a histogram. It is used in, for example, the processing of infrared images of moving targets, for monitoring road traffic.

Binary segmentation means to classify the pixels of a digital image on the basis of their grey level as belonging to a background or to a target. A pixel is classified, for example, as belonging to the target if its grey level is equal to or exceeds a threshold; otherwise it is classified as belonging to the background.

It is known that an image is a set of pixels, and each pixel has a certain grey level encoded over a predetermined number of bits. For example, if the encoding is effected over 8 bits, the grey levels can assume all values between 0 and 255. It is to be assumed hereinafter that the value 255 corresponds to a bright pixel and the value 0 to a black pixel.

BACKGROUND OF THE INVENTION

Making a simple histogram of an image involves counting the number of pixels in the image corresponding to each of the grey levels. This count renders it possible to establish a histogram in which the grey levels, for example, 0 to 255, are plotted as the abscissa, and the number of pixels corresponding to each of the levels is plotted as the ordinate.

The simple histogram of an image to be segmented is formed from peaks which are characteristic of the image, i.e., the background or one or more bright objects. To effect proper segmentation of the bright object(s) in conjunction with the use of a simple histogram requires determining from the histogram the grey level indicating the foot of the peak corresponding to the object(s). For example, the simple histogram of an image which represents a bright object on a black background will produce a histogram which first shows a portion corresponding to a large and relatively constant number of pixels in the lower grey levels; thereafter a minimum corresponding to a small number of pixels, while going to the higher grey levels, and finally a portion corresponding to a large number of pixels, before a new decrease in the highest grey levels. The minimum of this histogram corresponds to the break between the low grey level portions representing the background and the high grey level portions representing the object to be detected.

As opposed to a simple histogram of an image, an accumulated histogram involves counting, for each grey level, the number of all the pixels having a grey level below that predetermined grey level. This count enables the formation of a histogram in which the grey levels, for example, 0 to 255, are plotted as the abscissa, and the number of accumulated pixels is plotted as the ordinate.

The histogram obtained for the accumulated histogram procedure is the representation of an ascending function, contrary to the histogram obtained for the simple histogram procedure. This function is an ascending function because of the fact that when passing from one grey level to another higher grey level, a pixel number, either zero or positive, is added to the pixel number found for the previous grey level.

Returning to the previously considered image discussed in the context of the definition of the simple histogram, i.e., an image which represents a bright object on a black background, the accumulated histogram of that image will furnish a histogram which first shows an approximately linearly ascending portion, corresponding to the background; thereafter, a portion in which the number of pixels plotted as the ordinate is substantially constant, corresponding to the region in which the number of added pixels decreases from one grey level to the other when one passes towards the higher grey levels; and finally a portion with an ascending level, corresponding to the object.

It is an objective of the invention to provide a method which puts the histogram into effect as a segmentation tool.

A further objective of the invention is to provide a method which automatically determines the grey level which provides the break between the grey levels belonging to the background and those belonging to the target (i.e., one or more objects), i.e., the minimum value or threshold of the grey levels belonging to the target, so that the grey levels belonging to the target can be selected and the background eliminated.

The simple histogram has shown that this break corresponds to the foot of the peaks, while in the accumulated histogram the break corresponds to a break between a flat region and an acceleration of the progression of the grey levels.

Problems encountered in segmentation by using a threshold and obtaining that threshold from a histogram can be found in the text entitled "Computer Science and Applied Mathematic: Digital Picture Processing" by Ariel Rosenfeld and Avinash C. Kak, published by the "Academic Press, New York, San Francisco, London, 1976", more specifically in chapter 8, entitled "Segmentation", beginning at page 260.

The method of the invention intends to solve the problems associated with the segmentation of an image containing one or a plurality of moving objects. Differential techniques known to persons skilled in the art have made it possible to obtain the location of an object or objects in an image and have provided knowledge that each of the objects has limited dimensions. Consequently, the object may optionally be examined in a window, for example, a window of 50×50 pixels, i.e., an image portion or subimage.

Thus, another objective of the invention is to provide a method which preferably applies to an object or to objects located in a subimage, but which can nevertheless be applied to objects located in the full image.

Still another objective of the invention is to provide a method of local binary segmentation.

Prior art segmentation methods involving use of a histogram have a serious drawback residing in the fact that the histogram does not take into account the geographical distribution, or topology, of the pixels. That is to say that, when the histogram is being established, counting of the pixels is effected at a certain grey level independently from their location in the image. Consequently the counting operation only provides statistical data of the image and no morphological data. This makes it difficult to distinguish the effect of noise pixels which have a grey level in excess of the background grey level.

When one compares segmentation operations using two consecutive grey levels X and X+1, each as a threshold, the following two events may occur:

(a) the segmentation operation with threshold X+1 results in Y fewer noise elements (i.e. pixels) being classified as belonging to the target as compared to the segmentation operation with threshold X; or (b) the segmentation operation with threshold X+1 results in Y fewer pixels (pertaining to the target and not noise) being classified as belonging to the target as compared to the segmentation operation with threshold X. The known methods of obtaining a segmentation threshold from a histogram cannot distinguish between these two events, and thus these two events lead to opposite conclusions as regards the choice of the segmentation threshold. Thus, if one of the known methods of providing a threshold from a histogram is applied to a bright object against a blacker but noise-infested background, the determination of the threshold is performed with great inaccuracy. This is because of the fact that the threshold is situated in a region in which the contribution of the number of bright objects comes not only from the object to be detected but also from the noise elements scattered over the background.

SUMMARY OF THE INVENTION

The above-mentioned problems are obviated, and the objectives of the invention are achieved by using a method of binary segmentation of a digital image, comprising the steps of accumulating counts of isolated objects in respective threshold images obtained by thresholding the digital image at respective grey levels, the counts as a function of the grey levels forming a histogram;

determining a segmentation threshold automatically on the basis of the histogram; and thresholding the digital image at the determined segmentation threshold.

Thus, the topological distribution of the pixels by their grey levels is taken into account, which renders it possible to solve the problems relating to the uncertainty about the choice of a threshold that is most suitable for segmentation.

In an embodiment of the invention, the segmentation threshold is determined by taking the first grey level above which the histogram never exceeds a predetermined number. The predetermined number represents the number of objects expected. In this way, a simple method for selecting the appropriate threshold producing the expected number of objects is provided.

In accordance with the invention, in the preceding scenario of a bright object on a noisy black background, the histogram will have on the one hand, in the lowest grey levels, peak corresponding to the accumulated count of the object to be detected and of all of the noise elements which are scattered over the background zone; and on the other hand, in the highest grey levels, a substantially flat range which corresponds only to the number of objects to be detected and which is substantially constant.

In another embodiment of the invention, the segmentation threshold is determined as a lower bound of a range of grey values in which the histogram has a flat, non-zero height.

The method of the invention renders it possible to distinguish between the two events described hereinbefore (on page 5): in the first case, in accordance with the method of the invention the number of objects between the thresholds at X and X+1, decreases by Y, while in the second case, the number of objects remains unchanged. Consequently, those two events can perfectly be separated from each other and will lead to different segmentations.

The method in accordance with one embodiment of the invention can put into effect a particularly reliable manner of determining the correct threshold for segmentation through calculating, for a plurality of test grey levels, a deviation measure combining (i) a deviation from a vertical line of a first slope of a smoothed histogram curve as a function of grey level on a background grey level side of the test grey level, and (ii) second deviation from a horizontal line of a second slope of the histogram curve away from the background grey level side of the test grey level, the segmentation threshold being determined by locating a minimum of the deviation measure. At the test grey value where the slope changes from a rapid fall to a substantially flat slope, the contribution of noise to the number of objects ceases. The deviation measure provides a straightforward criterion to detect that test grey value. In a specific embodiment, the deviation measure is the sum of the squares of the first and second deviations.

The invention also relates to a device for executing the method.

BRIEF DESCRIPTION OF THE DRAWINGS

The invention will now be described in greater detail hereinafter, with reference to the accompanying drawings, in which.

DESCRIPTION OF THE PREFERRED EMBODIMENTS

Before beginning discussion of the method and device in accordance with the invention, it is important to understand that: (a) in a binary image with a given interpixel distance, two pixels are said to be linked if the distance separating them is less than a reference distance; and (b) an object is defined by a set of linked pixels. Now to the invention.

Figure 1:
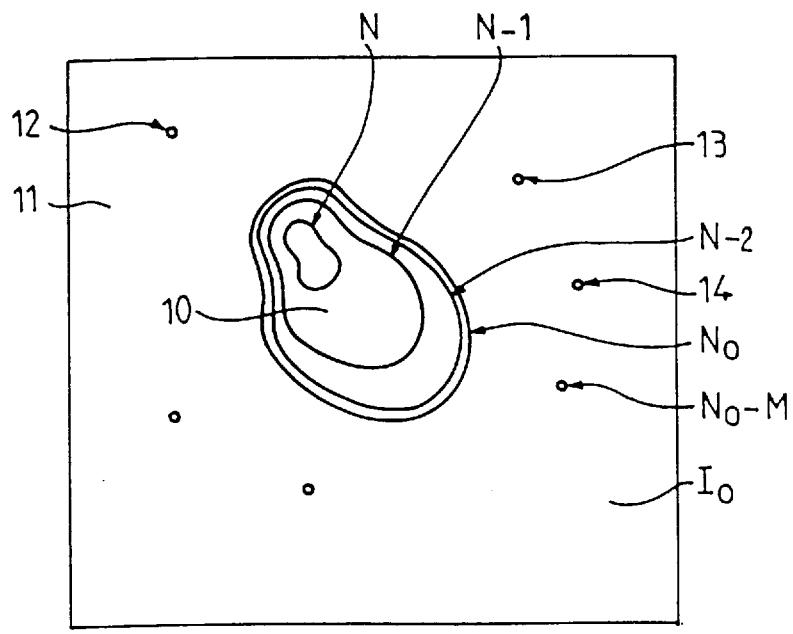
FIG. 1 is a plan view of an image containing a bright object on a black background, with lines of equal grey levels.

Referring to FIG. 1, the image to be segmented is a subimage $I_0$. It is assumed that the subimage $I_0$ is located in an image I of a moving object. By differential techniques known to persons skilled in the art, an operation for detecting an object in the image I is performed, as well as an approximate localization of the object. It is also assumed that the object has limited dimensions and can be completely encompassed in a window of, for example, 50×50 pixels, bounding the subimage $I_0$.

By applying the method in accordance with the invention to the subimage instead of to the complete image, a more accurate segmentation can be obtained, although it takes up a great deal more calculation time than the known procedures. Nevertheless, the method in accordance with the invention can be applied to complete images and operates in a fully satisfactory manner. However, preference should be given to its use on subimages in the case in which there are 1, 2 or few objects to be segmented.

The method in accordance with the invention is based on a segmentation method providing a histogram from which a threshold is obtained. Such a method assumes that the object or the objects, and the background are disjointed in terms of their grey level. If one works on subimages, this hypothesis is generally verified, and the method in accordance with the invention can then be employed.

The invention relates generally to a method of automatically detecting the break between the background and the object and, more specifically, to a method which provides morphological information about the structure of the histogram.

Referring again to FIG. 1, the image to be segmented includes a bright object 10 against a noisy background 11, the latter containing points 12, 13 and 14 formed by bright pixels against a black background. The bright object 10 does not have a uniform grey level, as is generally the case, because of the fact that the image originates from a physical phenomenon, and physical phenomena are, in most cases, continuous. In the image, the object appears with a very bright center. This center can be, for example, the engine of a vehicle in an infrared picture. If an engine is indeed involved, its image diffuses and so the image around the very bright center is a generally continuous attenuation of the grey levels from the heart of the object towards the exterior. If the heart of the object has a grey level N, assuming the scale of the grey levels extend from N to 0, for example, from 255 to 0, different grey levels in the image can be identified when descending along the scale of the grey levels from N downwards. Lines having equal grey levels are found at N-1, N-2 and etc., whose periphery is increasingly larger. Eventually a value $N_0$ is reached, which corresponds to the extreme limits of the object, beyond which one sees that the surface of the object does not extend. By going downwards still further along the scale of grey levels from $N_0$, the background is entered, which is diffuse and distributed over the overall subimage. On arriving in the background zone, noise elements 11, 12, 13, 14 and etc. appear, whose grey level is less than the level No, for example, $N_0$–M.

The grey level $N_0$, which effects the break between the background and the object, is the threshold which the method in accordance with the invention determines that being one of its objectives. This objective is achieved by constructing an accumulated histogram of the number of objects in, which at each grey level X associates with such level the number of objects Y included in a binary image obtained by thresholding the image $I_0$ at the grey level X; and determining the segmentation threshold from this histogram. Thus, in accordance with the invention, one does not measure the number of pixels as in the prior art technique, but rather the number of objects in the image, an object being a set of linked pixels as already noted above.

Figure 2:
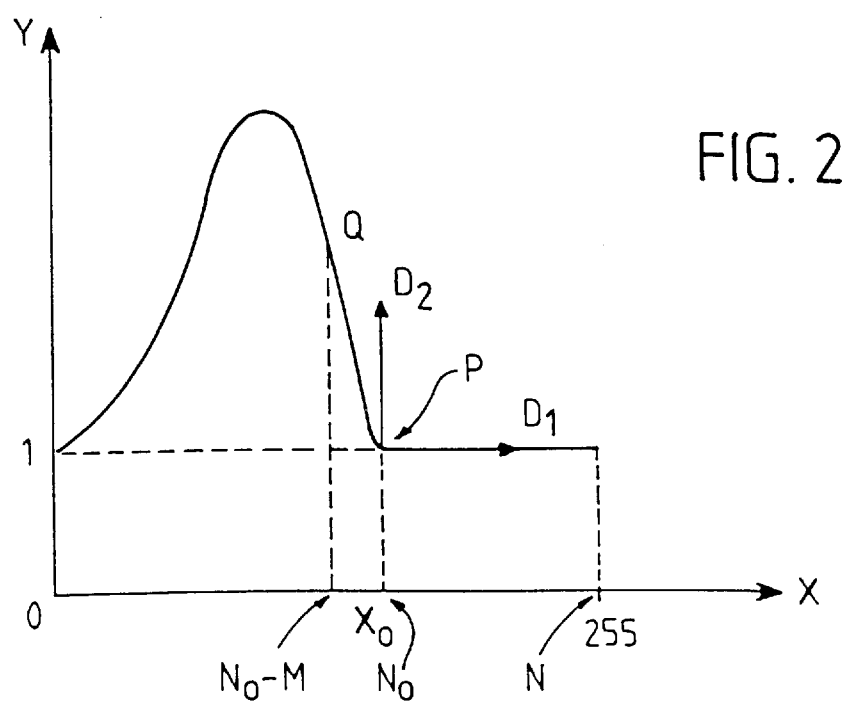
FIG. 2 shows an example of a smoothed histogram of the objects per grey level in accordance with the invention.

From FIG. 1, it can be seen that between the maximum grey level N and the grey level $N_0$, the latter corresponding to the exterior edges of the object, -there is one single object, the object 10. So, if an accumulated histogram of the number of objects per grey level isconstructed, a flat curve portion is observed which corresponds to a constant number of objects between N and $N_0$. Sliding down the scale of grey levels from $N_0$ downwards, the background zone is reached where an increasing number of objects caused by noise are found. Then, one sees a peak corresponding to a large number of objects appearing at values of the grey levels less than No. Thereafter, sliding still further down the scale of grey levels, the number of objects decreases because at the weak grey levels recombinations of broken-up objects which will merge together begin to appear. Then, at the grey level 0, one single object will be found due to the recombination. In its flat portion, the histogram is very smooth. This is because, when passing from one grey level to a lower grey level, although the object shown in FIG. 1 grows bigger, the number of objects contained in the image does not vary. In the example chosen, the number of objects is always 1. (Reference should be made to FIG. 2; however, it must be noted that FIG. 2 is a smoothed representation of a histogram in accordance with the invention. The importance of this will be described below.)

The accumulated histogram obtained in accordance with the invention, whatever the number of objects to be detected in the subimage, differs greatly from the conventional accumulated histogram already described. More specifically, it is not monotonous because it has at least one peak, a falling peak edge and then a constant portion.

When the number of objects expected to be detected in the subimage is known in advance, the threshold may be set at the first grey level from which onwards this number remains constant along the histogram. For example, when the expected number is 1, the grey level $N_0$ would be chosen. (See, for example, FIG. 2.)

When the number of objects is not known in advance, the threshold must be searched for. The threshold searched for, which is the best threshold for the segmentation, is located by searching for a point positioned in the histogram where objects due to noise begin to appear while descending the scale of the grey levels. Such a point exists at point P of FIG. 2.

FIG. 2 is a representation of a histogram in accordance with the invention which has been smoothed in accordance with methods known to persons skilled in the art. Such smoothing avoids errors caused by noise and enables the point P to be found in the manner described below more easily. The significance of the smoothing will become clear to those skilled in the art in the following discussion.

To the right of the point P, the smoothed histogram curve in accordance with the invention has a horizontal portion, and to the left of the point P, this curve, because of the explosion of the number of objects, has an almost vertical portion. With the object of determining the abscissa X of the point P corresponding to the threshold $N_0$ of the grey levels searched for, the derivative will be calculated to the left and to the right of the curve of the points in the presumed region of the threshold $N_0$. The derivative at the left and the derivative at the right are each represented by a vector, $D_2$ and $D_1$, in FIG. 2, respectively. The threshold searched for corresponds to the point P of the curve for which simultaneously:

the derivative at the right is near zero, and
the left derivative at the left approaches infinity.
In the smoothed histogram curve of FIG. 2, if
α is the arctan, i.e., the slope, of the derivative to the right of X, and
β is the arctan of the derivative to the left of X, the segmentation threshold $X_0$, which corresponds to the grey level $N_0$ and to the point P of the curve, is obtained by minimizing the deviation measure given by:

$$G(X)=\alpha(X)^2+[\beta(X)-\pi/2]^2.$$

That equation corresponds to minimizing using the least squares method over an Euclidian distance.

The segmentation method in accordance with the invention can be put into effect by a program, provided the following precautions are taken:

(a) the subimage to be submitted to the procedure is to have a background which is made uniform; and (b)

calculation of the derivatives is made over sufficiently wide supports. As for the first precaution, it may actually happen that the background is formed by two large zones of highly different grey levels. This results in the histogram of the number of objects having two peaks corresponding to the background, instead of one peak; and between the two peaks, a minimum is found which might be confused with the point P searched for. Such situation must, therefore, be avoided, and consequently it is better to make the background uniform.

Persons skilled in the art have tools at their disposal to perform such an operation of making the background uniform. More specifically, what is commonly denoted a top-hat morphological technique, i.e., a morphological filtering. At the output of the top-hat, the background of the subimage is uniform and the histogram of the number of objects has only one single peak, and consequently, the possibility of determining the point P can be made without any ambiguity. However, it should be noted that if the background of the subimage is uniform to begin with, the top-hat technique is not necessary, and so the method of the invention is directly applicable to a very large number of images.

As for the second precaution, since the images processed in accordance with the inventive method are digitized, the derivatives must be calculated while taking a certain number of points to the left and to the right of the assumed point P. So as to avoid errors which might be caused by noise, it is also here recommendable to smooth the histogram (in this case not the actual histogram but rather the function (i.e., relationship) representing it).

The method of the invention has been tested on many sequences and has yielded results which far surpass the results of conventional methods of obtaining a threshold from a histogram. In particular, the method in accordance with the invention has the following advantages:

(a) in so far as a segmentation technique using a threshold is concerned, the method does not lead to any deformation of the contours of the extracted objects, thanks to the fact that it does not require the use of linear filters, which are required in segmentation by relaxation methods, which introduce a deformation of the image contours, and which reduce the sharpness of the contours;

(b) the method does not require the determination of a threshold, since its objective is to determine the threshold automatically;

(c) the method does not require any critical parameters. (It has been stated that one nevertheless needs to define some parameters, for example, the maximum dimensions of the object, the reference distance to define the objects or the size of the element forming the top-hat; but these parameters can be fixed nonrecurrently for a large range of sequences, and they are not numerous and are not critical. For example, all the sequences tested during the tests of putting the invention into effect had the same parameters);

(d) the method is highly insensitive to noise; and (e) the method provides in the course of time stable contours.

The only disadvantage associated with the method in accordance with the invention is that it is somewhat uneconomical as regards calculation time. This is not a serious drawback, however, as one preferably works with subimages, so on a small number of pixels.

The method in accordance with the invention could be implemented as a device including a number of processors equal to the number of grey levels in the image of which it is intended to calculate the number of objects. Then, N parallel-arranged processors would be available, each for calculation of the number of objects at a given one of the N grey levels. Such a device, while possible, would however be expensive.

Since the method of the invention is a little uneconomical as regards calculation time, it is not intended for real time use. However, this calculation time is not prohibitive. An image can be processed in a matter of seconds.

Figure 3:
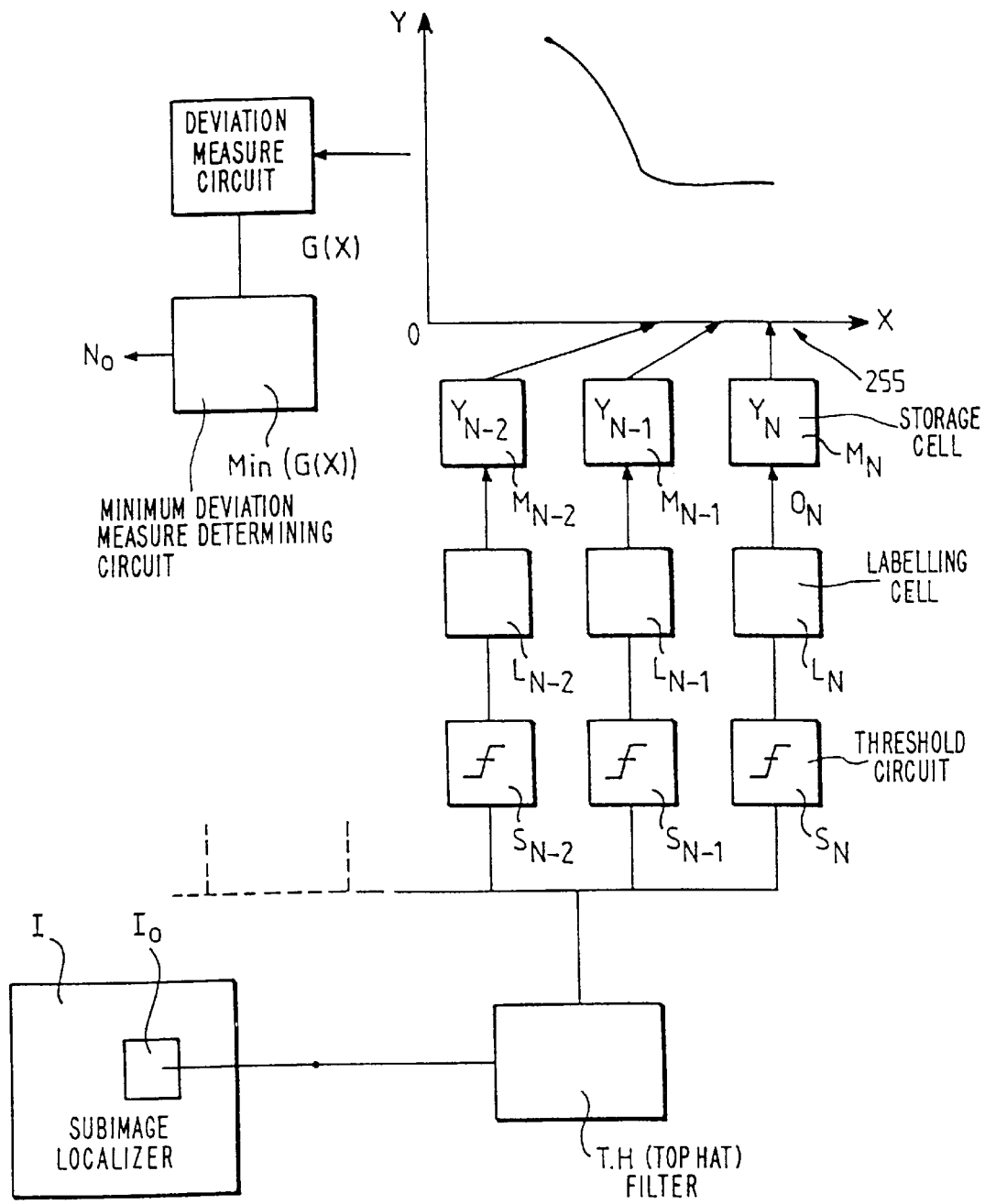
FIG. 3 is a block circuit diagram for putting the method in accordance with the invention into effect.

The implementation of the method in accordance with the invention can be effected in accordance with the functional circuit diagram shown in FIG. 3. First, the image I is processed differentially in a circuit to localize the object to be segmented by differentiating and defining the subimage $I_0$ to be acted upon. This step can be effected by methods of differentiation known to persons skilled in the art. Next the subimage $I_0$ is applied to the filter T.H. of the top-hat type, which has the property of not deforming the contours, but which does consume a great deal of time, as it must calculate the maxima and the minima of extensive zones. Thereafter there are N parallel paths. Each path comprises a threshold circuit which thresholds the subimage $I_0$ at N, N-1, N-2 etc., respective grey levels, wherein N is the maximum grey level of the image. For an encoding over, for example, 8 bits, the maximum grey level is 255. The thresholds are denoted by $S_N$, $S_{N-1}$, $S_{N-2}$ etc. in FIG. 3.

Connected to each threshold circuit is a labelling cell, wherein the number of objects $Y=O_N$ within the binary image obtained by the preceding thresholding action is calculated for each path. This calculation is performed in accordance with a method known to persons skilled in the art as labelling. N labelling cells, denoted $L_L$, $L_{N-1}$, $L_{N-2}$ etc. are depicted in FIG. 3.

Referring again to FIG. 3, each labelling cell is connected to a storage cell for storing the number $O_N$ for each path. The storage cells are denoted $M_N$, $M_{N-1}$, $MN_{-2}$ etc. in FIG. 3. Then, from all the data contained in the N storage cells a smooth histogram curve is made of the number of objects Y per grey level X of the type as shown in FIG. 2. Having formed this histogram curve, the derivatives at the left and at the right are thereafter calculated on an adequate support, as already stated in the foregoing, thereafter the criterion G(X) is applied and the minimum of this criterion is searched.

As regards the labelling function, it was mentioned above that linked pixels are acted upon, and, in that case, persons skilled in the art know how to realize labelling processors. Labelling is then effected by performing in the device as many processing steps as there are grey levels to be processed. To save time, it is not necessary in practice to plot the overall histogram curve but to concentrate only on the zone which includes the constant portion and the portion of the peak edge at approximately mid-height (point Q in FIG. 2). Thus, the calculation load is mitigated. From there, while decrementing the grey levels, a rather significant increase in the number of objects is observed and constructing the curve is stopped, which can be effected by definition of a stopping criterion. Generally, some hundred steps are sufficient to form the pertinent portions of the curve containing the point P searched for, instead of the 255 steps which would be necessary for the construction of a complete curve. In spite of all this, using this device renders the method in this case approximately 100 times slower than in real time.

As regards the top-hat procedure intended to make the background uniform, such a procedure is known to persons skilled in the art and properly speaking does not form part of the invention as such. This top-hat method consumes a great deal of time, but on the other hand is very useful for difficult situations in which the background is not uniform. It does not degrade the shape of the objects of size smaller than the size of its structural element. The top-hat method may be replaced by any other method known to persons skilled in the art for making the background uniform, provided it does not degrade the contours of the objects to be recovered.

I claim:

1. A method of binary segmentation of a video image which includes at least one target object and at least one noise element against a common background; said image being represented by a video signal corresponding to grey levels of respective pixels therein, a target object having pixel grey levels which differ from the pixel grey levels of the background and of noise elements; said method comprising the steps of:
   (a) thresholding the video signal at respective grey threshold levels so as to derive for each threshold level a digital signal representing a binary segmented image corresponding to that threshold level;
   (b) determining from each of the digital signals, by labelling, a count of the number of objects in the corresponding binary segmented image, and storing the respective counts applicable to the respective binary segmented images;
   (c) forming a histogram of the stored counts as a function of the respective threshold levels;
   (d) automatically determining from said histogram a segmentation threshold applicable to said video image for distinguishing target objects from background and noise elements therein; and
   (e) applying said segmentation threshold to said video signal to derive a binary segmented video signal representing a binary segmented form of said video image in which target objects are distinguished from background and noise elements therein.

2. The method according to claim 1, wherein said segmentation threshold is determined by locating a first grey level above which the count of said histogram never exceeds a predetermined number.

3. The method according to claim 1, wherein said segmentation threshold is determined by locating the lowest grey level in a range of grey levels for which said histogram has a flat, non-zero height.

4. The method according to claim 1, further comprising smoothing said histogram to form a smoothed histogram curve; and wherein said segmentation threshold is determined by
   determining, for each of a plurality of test grey levels, a deviation measure combining a deviation of a first slope of said histogram curve from a vertical line and a deviation of a second slope of said histogram curve from a horizontal line; and
   locating that one of said test grey levels having the minimum for said deviation measure.

5. The method according to claim 4, wherein said deviation measure is a sum of the squares of the deviations of said first and second slopes.

6. The method according to claim 2, wherein said predetermined number is the number of target objects expected in video said image.

7. The method according to claim 1, further comprising smoothing said histogram to form a smoothed histogram curve; and wherein said segmentation threshold is determined by locating a first grey level above which the count of said histogram curve never exceeds a predetermined number.

8. The method according to claim 7, wherein said predetermined number is the number of target objects expected in said video image.

9. The method according to claim 1, further comprising smoothing said histogram to form a smoothed histogram curve; and wherein said segmentation threshold is determined by locating a lowest grey level in a highest range of grey levels in which said histogram curve has a flat, non-zero height.

10. The method according to claim 1, further comprising processing said video signal prior to thresholding thereof so as to compensate for grey level variations of the background of said video image but without degrading representation by said video signal of contours of said at least one target object.

11. Apparatus for binary segmentation of a video image which includes at least one target object and at least one noise element against a common background; said image being represented by a video signal corresponding to grey levels of respective pixels therein, a target object having pixel grey levels which differ from the pixel grey levels of the background and of noise elements; said apparatus comprising:
   input means for receiving the video signal;
   thresholding means coupled to said input means for subjecting the video signal to thresholding at respective grey threshold levels so as to derive for each threshold level a digital signal representing a binary segmented image corresponding to such threshold level;
   processing means coupled to said thresholding means for determining from each digital signal, by labelling, a count of the number of objects in the corresponding binary segmented image;
   accumulating means coupled to said processing means for storing the respective counts applicable to the respective binary segmented images;
   segmentation threshold determining means coupled to said accumulating means for automatically determining a segmentation threshold on the basis of said stored counts; and
   means coupled to said segmentation threshold determining means and to said input means for thresholding said video signal in accordance with said segmentation threshold, to thereby derive a binary segmented video signal representing a binary segmented form of said video image wherein target objects are distinguished from background and noise elements therein.

12. Apparatus according to claim 11, wherein said video image is a localized portion of a larger video image and said apparatus further comprises means for deriving a video signal representative of said localized portion from a video signal which is representative of said larger video image.

13. Apparatus according to claim 11, further comprising top hat filter means coupled to said input means for equalizing said video signal for grey level variations of the background of said video image but without degrading representation by said video signal of contours of said at least one target object.

14. Video image segmentation apparatus 1, wherein said segmentation thresholding determining means comprises:
   means for creating a representation of a smooth histogram curve of said objects as a function of said respective grey levels; and
   means for determining a grey level at which a first slope of said histogram curve approaches infinity and a second slope of said histogram curve approaches zero.

* * * * *